United States Patent [19]
Stemsrud et al.

[11] 3,922,908
[45] Dec. 2, 1975

[54] METHOD AND APPARATUS FOR MEASURING AND RECORDING THE TENSION AND RIGIDITY OF A SKI UNDER STRESS

[75] Inventors: Finn Stemsrud, As; Reidar Otto Ullevålseter, Oslo; Oystein Mengkrog, As, all of Norway

[73] Assignee: Norges Landbrukshogskole, As, Norway

[22] Filed: Aug. 5, 1974

[21] Appl. No.: 494,859

[52] U.S. Cl. .................................................. 73/100
[51] Int. Cl.² ............................................. G01N 3/20
[58] Field of Search ....................... 73/100, 89, 172

[56] References Cited
UNITED STATES PATENTS

| 2,693,107 | 11/1954 | Paden | 73/100 X |
| 3,116,637 | 1/1964 | Haas et al. | 73/172 |
| 3,388,591 | 6/1968 | Booth et al. | 73/100 |

FOREIGN PATENTS OR APPLICATIONS

| 68,203 | 8/1941 | Norway | 73/100 |

Primary Examiner—Charles A. Ruehl
Attorney, Agent, or Firm—Young & Thompson

[57] ABSTRACT

The tension and rigidity of a ski is measured and recorded under stress on the ski in that the pressure load against the base layer is recorded in a specially designed measuring bench. The ski is disposed on a rigid base and is displaced with respect to a pressure-sensitive member which records the pressure distribution at the various areas of the ski. The ski is loaded during the measurement with a predetermined pressure at the location where the binding is to be mounted. The pressure distribution is recorded on a recorder.

5 Claims, 4 Drawing Figures

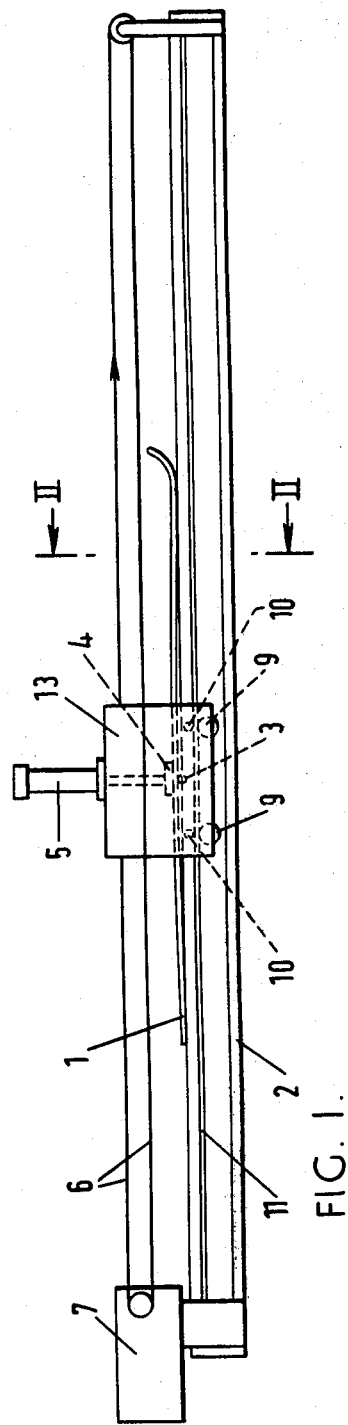
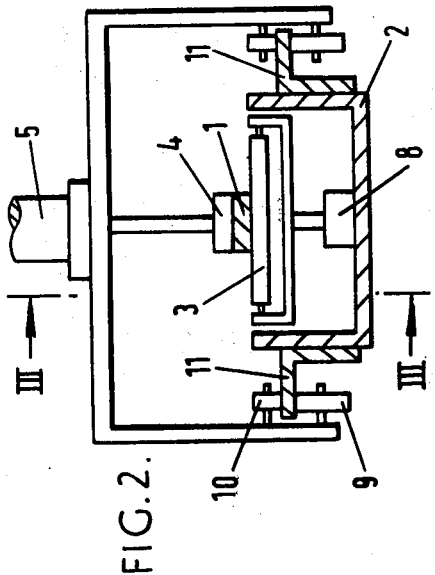

METHOD AND APPARATUS FOR MEASURING AND RECORDING THE TENSION AND RIGIDITY OF A SKI UNDER STRESS

The invention relates to a method of measuring and recording the tension and rigidity of a ski under stress by measuring the pressure load against a base surface, and the invention also relates to an apparatus for use with the method. The object of the invention is thus to provide a method by which it is possible to measure and record the characteristics of a ski, so as to produce characteristics preferably in the form of a curve, for the ski indicating essential information as to frictional conditions of the ski during use. In the first place the method permits measurements of the skis so that it is possible to form pairs where both skis have the same characteristics. Inasmuch as the body weights of skiers are different, it is also possible, by means of the invention, to adapt the skis to the user.

A further object of the invention is to provide a method by means of which the information obtained allows specialization of skis to various requirements so as to permit the most effective utilization. The measurements according to the method also permit the "reproduction" of skis so that corresponding skis can be constructed from types of wood other than those conventionally used, or of plastic material, aluminium and the like.

The object of the invention is, in general, to provide a method for measuring and recording the tension and rigidity of a ski by measuring the average pressure of a ski against the base surface during use, i.e. under differing weight loads, to carry out the object of the invention set forth hereinabove. The measurement of the pressure distribution over the length of the ski is carried out without downward bending of the ski.

From German publication No. 1,063,405, an apparatus for measuring the rigidity of a ski is known, however, in this apparatus the measurement is undertaken by recording the downward bending at at least three points along the length of the ski. In the said German publication, this is carried out in that the load at the ski binding is gradually increased, and two values are measured, viz. when contact first is effected in the middle of the ski and thereafter when the ski is entirely flattened and the load begins to act, uniformly distributed at all measuring points. By means of the German publication no curve is obtained which indicates the pressure loads at all points of the ski, therefore, and it can then be said that the German publication indicates the resilience of a ski only while the invention relates to the distribution of the load pressure against a rigid base surface on movement of the ski so that two different measuring methods are concerned.

From Norwegian Pat. No. 68203, an apparatus is further known for indicating the downward bending of ski under stress. This apparatus gives a stress point characteristic in the same manner as the German publication, but on a soft base layer. In the apparatus according to the Norwegian patent, only the downward bending is recorded and the object of this apparatus is to compare two skis and the downward bending properties thereof, possibly in order to compare the skis to a perfect example.

The method according to the invention is thus intended for determining and recording the tension and rigidity of a ski under stress by measuring the pressure load against a base surface and the method is characterized in that the ski, on a rigid surface, is moved with respect to a pressure-sensitive member which registers the pressure distribution at the various areas of the ski, the ski during measurement being loaded with a predetermined pressure at the location where the binding is to be mounted.

It is thereby expedient that the ski be passed over a pressure recording member on the rigid measuring bench.

An apparatus for carrying out the method is characterized by a bench having support members (abutment members) for the ski over the entire length of the bench and provided with a pressure recording member, and in that a pressure piston with cylinder is arranged above the ski for application of a desired force against the ski, the said piston being displaceable along the bench together with the ski.

The support members on the bench can be rollers. The pressure piston can be displaced by means of a power unit and conveyed by rollers on tracks along the bench.

The invention is further explained hereinbelow by means of an embodiment example illustrated in the drawings, which:

FIG. 1 a diagrammatic side view of an apparatus for carrying out the method,

FIG. 2 a section through the apparatus of FIG. 1 along the line II—II,

Figure 3:
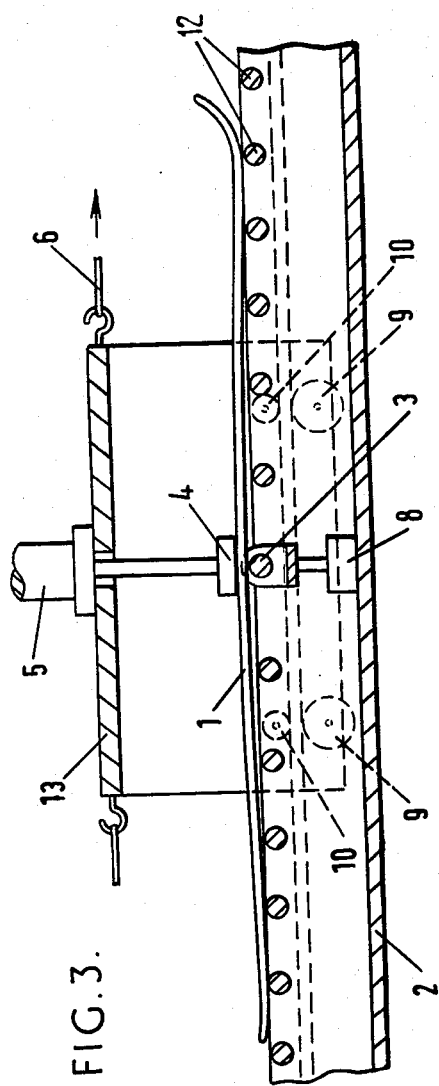
FIG. 3 is a section along the line III—III in FIG. 2.

FIGS. 1–3 illustrate an apparatus for measuring the tension and rigidity of a ski. The apparatus consists of a measuring bench 2, which, in the example shown, is of a length which is somewhat longer than twice the length of the ski. In the upper face of the bench 2, support rollers 12 are arranged along the entire length thereof for a ski 1 (FIG. 3). Immediately below the upper face of the bench 2 a pressure-sensitive roller 3 is suspended which records the pressure load on a recorder 8, the circumference of the roller 3 being on a level with the support rollers, i.e. minimally above them.

The pressure-sensitive roller is of conventional type and based on strain gauges, semi-conductors, compressed air, hydraulic air, or the like. The recorder can be of any type whatsoever.

A pressure piston 4 is arranged over the bench 2 said piston being connected to a pressure cylinder 5 and suspended in a suitable manner in a frame 13 which is guided on rollers 9 and 10 along the tracks or edge flanges 11 of the bench 2. The frame 13 is secured to an endless cord 6 which is connected to a drive means 7 which can drive the frame 13 and thereby the pressure piston 4 reciprocally along the bench.

When the characteristics of a ski are to be recorded, the ski is disposed at the far left of the measuring bench, and the pressure piston 4 is guided downwardly toward the location on the ski where the binding is to be mounted, and a desired weight load on the piston 4 is adjusted by means of the pressure cylinder 5. The drive motor 7 is started and the ski passed along the bench together with the pressure piston 4. When the point of the ski contacts the pressure-recording roller 3, the pressure load is recorded on the recorder 8, and, as the ski 1 is passed over the roller 3, curves are recorded corresponding to those illustrated on FIG. 4, while the ski rests on the support rollers.

Figure 4:
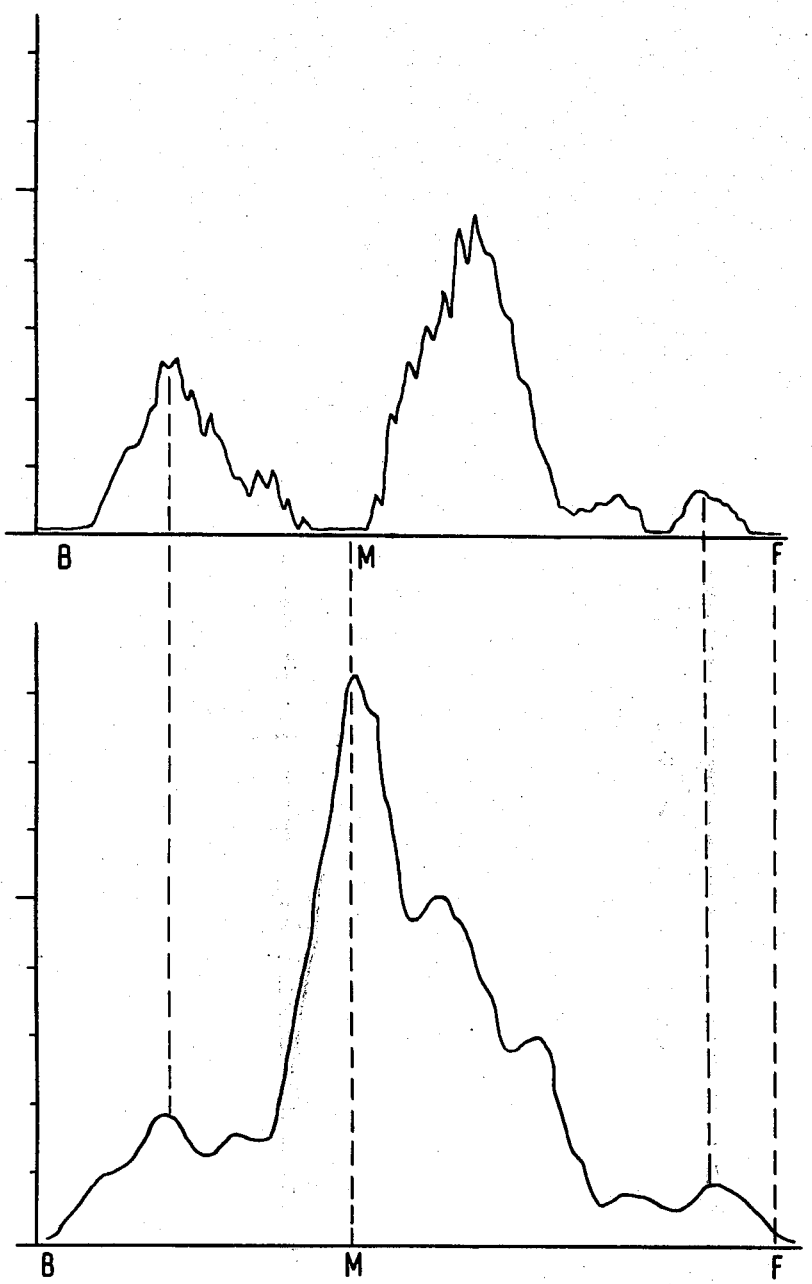
FIG. 4 shows two recording curves with differing weight loads, recorded by the apparatus of FIGS. 1–3.

FIG. 4 illustrates two curves recorded by an apparatus corresponding to FIGS. 1 and 2 where the pressure load against the base surface, recorded by the roller 3, is recorded over the length of the ski. The location of the point of the ski is marked by F and the rear edge of the ski by B. The top curve shows the pressure distribution at a weight load on the binding of 40 kp and the bottom curve a weight load of 90 kp. Such curves can be recorded for all skis, and pairs of skis can be put together in that skis with similar curves are selected.

From the upper curve, which illustrates the pressure load on a ski, it will be seen that with a skier of 80 kg having his weight distributed equally on both skis and, for example, running down-hill, the ski presses against the ground with a weak pressure on the fore edge of the ski. The location of the binding is disclosed by M. It will be seen, further, from the upper curve on FIG. 4, that two pronounced pressure points arise in front of and behind the ski binding. This curve is typical of a good cross-country ski. When lubricating the ski, slide lubrication should be disposed at the two main pressure points, the lubrication used directly below the binding being relatively unimportant.

If the skier now has his full weight on one ski, i.e. he climbs up-hill, the weight load on the ski is about 90 kg. From this arises the curve illustrated at the bottom of FIG. 4. It will be seen that a pronounced pressure load now occurs at the ski binding. This means that the skier, at this location, should use a lubrication suitable for a good grip.

If such curves are provided for all skis, it is possible, according to the usage thereof, to determine which skis are most suitable to the purpose. A poor ski for cross-country purposes would have no zero point of pressure load at the ski binding, for example, and would not be suitable for use under all conditions, therefore. This would also apply if the skier were too heavy for the ski.

If a ski manufacturer wishes to produce a ski from a different material, for example, of plastic, he can adjust the thickness and type of plastic so as to achieve curves corresponding to those for corresponding wooden skis, and this permits reproduceable skis. The method according to the invention has many possibilities, therefore.

Having described our invention, we claim:

1. A method for determining and recording the tension and rigidity of a ski under stress, comprising applying pressure against a ski at the location where and in the direction that a skier's foot applies pressure to the ski thereby to depress the ski against a rigid base, measuring and recording the pressure exerted by the ski at one point on said base, moving said ski lengthwise of the ski while maintaining on the ski the same said pressure whereby the ski progressively passes and presses against said point, and recording various pressures exerted by said ski against said point as a curve on a graph one of whose coordinates corresponds to the length of the ski and the other of whose coordinates corresponds to pressure.

2. Apparatus for examining and recording the tension and rigidity of a ski under stress, comprising a bench having support means for the ski lengthwise of the bench, pressure recording, recording means for recording length of the bench, pressure recording means intermediate the pressures sensed by said pressure recording means, means arranged above the bench for pressing a ski down on the bench at a point on the length of the ski corresponding to the location of the bindings of the ski, and means for moving said ski and pressing means lengthwise of the bench so that the ski progressively bears against said pressure recording means, said recording means producing a graph one of whose coordinates corresponds to pressure and the other of whose coordinates corresponds to the length of the ski.

3. Apparatus as claimed in claim 2, said pressing means comprising a cylinder and piston.

4. Apparatus as claimed in claim 2, said support means comprising rollers.

5. Apparatus as claimed in claim 2, said means for moving the pressing means lengthwise of the bench comprising rollers on which a carriage rides that carries said pressing means.

* * * * *